United States Patent [19]

Ito

[11] Patent Number: 5,185,867
[45] Date of Patent: Feb. 9, 1993

[54] METHOD AND APPARATUS FOR AUTOMATICALLY GENERATING SOFTWARE SPECIFICATIONS

[75] Inventor: Kisio Ito, Yokohama, Japan

[73] Assignee: Hitachi, Ltd., Tokyo, Japan

[21] Appl. No.: 323,662

[22] Filed: Mar. 15, 1989

[30] Foreign Application Priority Data

Mar. 18, 1988 [JP] Japan ................... 63-63295

[51] Int. Cl.⁵ .......................................... G06F 9/45
[52] U.S. Cl. ......................... 395/375; 364/280.1;
364/280.4; 364/280; 364/262.4; 364/DIG. 1;
395/700
[58] Field of Search ... 364/200 MS File, 900 MS File;
395/375, 700

[56] References Cited

U.S. PATENT DOCUMENTS

| | | | |
|---|---|---|---|
| 3,643,227 | 2/1972 | Smith | 364/200 |
| 4,103,328 | 7/1978 | Dalmasso | 364/200 |
| 4,315,315 | 2/1982 | Kossiakoff | 364/456 |
| 4,595,981 | 6/1986 | Leung | 371/19 |
| 4,713,775 | 12/1987 | Scott | 364/513 |
| 4,729,096 | 3/1988 | Larson | 364/300 |
| 4,730,315 | 3/1988 | Saito | 364/200 |
| 4,734,854 | 3/1988 | Afshar | 364/200 |
| 4,739,477 | 4/1988 | Barker | 364/900 |
| 4,742,467 | 5/1988 | Messerich | 371/19 |
| 4,809,170 | 2/1989 | Leblang | 364/200 |
| 4,815,029 | 3/1989 | Barker | 364/900 |
| 4,819,233 | 4/1989 | Delucia | 371/19 |
| 4,852,047 | 7/1989 | Lavalle | 340/712 |
| 4,853,851 | 8/1989 | Horsch | 371/19 |
| 4,860,203 | 8/1989 | Corrigan | 364/200 |
| 4,864,569 | 9/1989 | Delucia | 371/19 |
| 4,875,187 | 10/1989 | Smith | 364/900 |

FOREIGN PATENT DOCUMENTS

| | | |
|---|---|---|
| 62-84337 | 4/1987 | Japan . |
| 62-197826 | 9/1987 | Japan . |
| 62-221728 | 9/1987 | Japan . |
| 63-86021 | 4/1988 | Japan . |
| 63-98732 | 4/1988 | Japan . |

OTHER PUBLICATIONS

"Soft Eagle 2 for Automatically Generating System-Flow," Nikkei Computer, Jul. 7, 1986, pp. 121–136.
"Application Oriented Memory" Information Processing, 1986 No. 6.

*Primary Examiner*—Thomas C. Lee
*Assistant Examiner*—Eric Coleman
*Attorney, Agent, or Firm*—Fay, Sharpe, Beall, Fagan, Minnich & McKee

[57] ABSTRACT

In an information processing system for generating software specifications, a method, and apparatus, for automatically generating software specifications, facilitating software maintenance work by generating a high rank specification from at least one software product obtained by particularizing the high rank specification in software development. The method comprises the steps of reading information described in at least one software product obtained by particularizing a high rank specification, extracting information taken over from the high rank specification to the low rank specifications out of the information thus read, dividing the extracted information into common items and items single existing and relating to the common items, putting together singly existing items for every common item, arranging respective items on the basis of the information put together for every common item in a network form, generating network information, converting representation format of each item of the network information, and generating a high rank specification.

21 Claims, 16 Drawing Sheets

FIG. 3A

<JCL1: JCL FOR EXECUTING JOB NAME "JOB1">

| 10 | JOB  | JOB 1 |
| 11 | ASN  | EQUIP=DISK, FILE=FILE1, I/O=INPUT <br>      16          17         18 |
| 12 | ASN  | EQUIP=DISK, FILE=FILE2, I/O=OUTPUT <br>                                  19 |
| 13 | ASN  | EQUIP=PRINTER..., OUTCLASS=A <br>        20           21 |
| 14 | EXEC | PROGRAM 1 |
| 15 | END  |  |

FIG. 3B

<JCL2: JCL FOR EXECUTING JOB NAME "JOB 2">

| JOB  | JOB 2 |
| ASN  | EQUIP=DISK, FILE=FILE2, I/O=INPUT |
| ASN  | EQUIP=DISK, FILE=FILE3, I/O=OUTPUT |
| EXEC | PROGRAM 2 |
| END  |  |

FIG. 4

| JOB NAME | INPUT/OUTPUT DISCRIMINATION | FILE NAME | FORM NAME |
|---|---|---|---|
| JOB 1 | INPUT | FILE 1 | |
| | OUTPUT | FILE 2 | |
| | OUTPUT | | A |
| JOB 2 | INPUT | FILE 2 | |
| | OUTPUT | FILE 3 | |

FIG. 5

| | FILE/FORM NAME | UPDATE JOB NAME | REFERENCE JOB NAME | |
|---|---|---|---|---|
| FILE | FILE 1 | | JOB 1 | ~22 |
| | FILE 2 | JOB 1 | JOB 2 | ~23 |
| | FILE 3 | JOB 2 | | ~24 |
| FORM | A | JOB 1 | | ~25 |

FIG. 9A

⟨JCL1: JCL FOR EXECUTING JOB NAME"JOB1"⟩

```
JOB    JOB 1
ASN    EQUIP=DISK, FILE=FILE 1, I/O=INPUT
ASN    EQUIP=DISK, FILE=FILE 2                    ~29
ASN    EQUIP=PRINTER,,,OUTCLASS=A
EXEC   PROGRAM 1
END
```

FIG. 9B

⟨JCL2: JCL FOR EXECUTING JOB NAME "JOB2"⟩

```
JOB    JOB 2
ASN    EQUIP=DISK, FILE=FILE 2, I/O=INPUT
ASN    EQUIP=DISK, FILE=FILE 3, I/O=OUTPUT
EXEC   PROGRAM 2
END
```

FIG. 10

| JOB NAME | PROGRAM NAME | INPUT/OUTPUT DISCRIMINATION | FILE NAME | FORM NAME |
|---|---|---|---|---|
| JOB 1 | PROGRAM 1 | INPUT | FILE 1 | |
| | | OUTPUT | FILE 2 | A |
| JOB 2 | PROGRAM 2 | INPUT | FILE 2 | |
| | | OUTPUT | FILE 3 | |

30

SOURCE PROGRAM OF PROGRAM 1

```
main() {
35    fopen ("FILE1", input);
36    fopen ("FILE2", output);
37    fopen (" A ", output);
```

DATA PROCESSING SECTION

```
}
```

| PROGRAM NAME | INPUT/OUTPUT DISCRIMINATION | FILE NAME | FORM NAME |
|---|---|---|---|
| PROGRAM 1 | INPUT | FILE 1 | |
| | OUTPUT | FILE 2 | |
| | OUTPUT | | A |

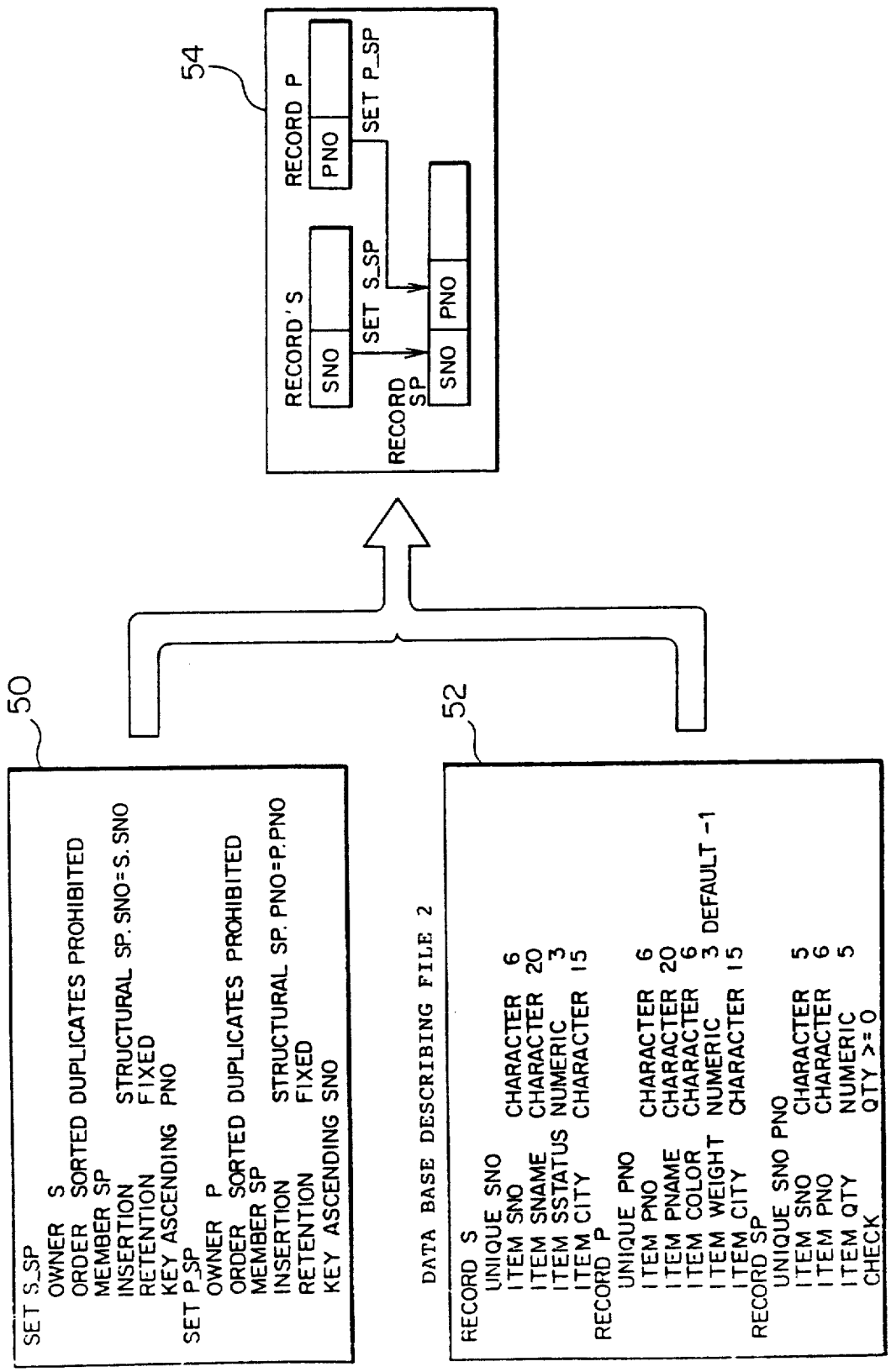

METHOD AND APPARATUS FOR AUTOMATICALLY GENERATING SOFTWARE SPECIFICATIONS

BACKGROUND OF THE INVENTION

The present invention relates to computer aided software development, and in particular to a method, and apparatus, for generating software specifications suitable for software maintenance.

A method generally used for software development comprises the steps of defining the function of the software to be developed, defining stepwise details of the software realizing the function to advance the design, and, finally, generating the program.

The result of the design is described as design specification per particularization step. In general, a specification particularizing each element (item) of a specification generated at a step is generated at the succeeding design step.

In order to generate these specifications and programs efficiently, development aiding tools such as various specification editors and program editors have been developed.

These methods are described in "Soft EAGLE 2 for automatically generating system flow", Nikkei Computer, Jul. 7, 1986, pp. 121 to 136, for example.

The prior art is effective when software is newly developed. However, the following problems occur when the software developed by using the prior art is subject to maintenance. When software specifications are altered, contents of descriptions in a high rank specification generated at an early stage may disagree with those of software products (such as programs, job control languages and low rank specifications) generated by particularizing the high rank specification. In this case, the specification does not represent contents of the actual program and job control language (hereinafter referred to as JCL), resulting in difficulty of maintenance.

Therefore, an example of the prior art relating to software maintenance is described in JP-A-62-84337. In this case, information of specifications generated at respective design stages of software design is stored in a data base. By comparing information included in respective specifications with each other on the basis of the data base, contradiction between information pieces contained in respective specifications is detected. Further, when information of a common item contained in a certain specification is altered, the altered common item is altered successively in relating specifications on the basis of the data base.

When this method is used, however, specifications ranked higher at the time when the specifications are generated cannot be amended. If information of specifications is further amended under this state, there is a fear that disagreement between a high rank specification and a low rank specification may be expanded.

In the above described prior art as well, the software maintenance work thus remains inefficient.

SUMMARY OF THE INVENTION

An object of the present invention is to facilitate software maintenance work by eliminating disagreement in information between specifications and the program or between a high rank specification and a specification obtained by particularizing the high rank specification.

In order to achieve the above described object, a method according to the present invention comprises the steps of analyzing contents described in a plurality of particularized specifications or at least one software product such as a program or JCL and extracting specification information to be included in the high rank specifications from the contents, unifying information of common items in the at least one specification of the extracted information, generating specification information of a high rank specification, i.e., an information diagram of items arranged in a network manner by using information of the unified common items and information of single items, and converting this specification information into a form of a high rank specification.

If information required for generating a high rank specification is not obtained from specification information contained in one kind of software product alone, the required information is obtained by analyzing information of another low rank software product and adding information contained therein to the above described extracted information.

If high rank specification information cannot be generated by using information contained in a software product alone, generation of the high rank specification can be achieved by adding information, required for the user to generate the high rank specification to, the low rank specification information.

On the basis of low rank specifications, and a software product such as a program, a high rank specification agreeing in contents with them can be generated efficiently as a result of the above described configuration.

Accordingly, mismatch in contents between specifications at respective design stages or between a specification and the program can be removed. As a result, the software can be utilized efficiently in software maintenance work.

Even if there occurs an alteration in information of a part of a low rank specification or the program, therefore, the information thus altered is taken over to high rank specifications as it is. Therefore, contents of the low rank specification or the program always agree with contents of generated high rank specifications facilitated.

Further, contents of low rank specifications or the program can be altered correctly if specification alteration is performed on the basis of a high rank specification thus generated.

BRIEF DESCRIPTION OF DRAWINGS

FIGS. 3A and 3B show examples of JCLs input to the first embodiment of the present invention.

FIG. 4 shows results of JCL analysis.

FIG. 5 shows JCL analysis results rearranged in accordance with job reference/update relations by paying attention to file/form (slip) names.

FIGS. 9A and 9B show examples of JCL inputted to the second embodiment.

FIG. 10 shows results of analysis of JCL examples shown in FIG. 9.

FIG. 17 is a concept diagram of a fifth embodiment of the present invention.

DESCRIPTION OF THE PREFERRED EMBODIMENTS

The preferred embodiment of a method, and apparatus, for automatically generating software specifications according to present invention will now be described by referring to drawings.

A first embodiment of the present invention will now be described.

With respect to the present embodiment, (1) a sequence of program execution steps in a job forming processing unit on a computer, and (2) a method for generating a data flow specification, i.e., a specification representing the data flow between jobs from a job control language (hereafter referred to as JCL) describing input and output units for the program, will now be described. The data flow specification is a high rank specification of JCL and is represented by a known data flow diagram.

Figure 1:
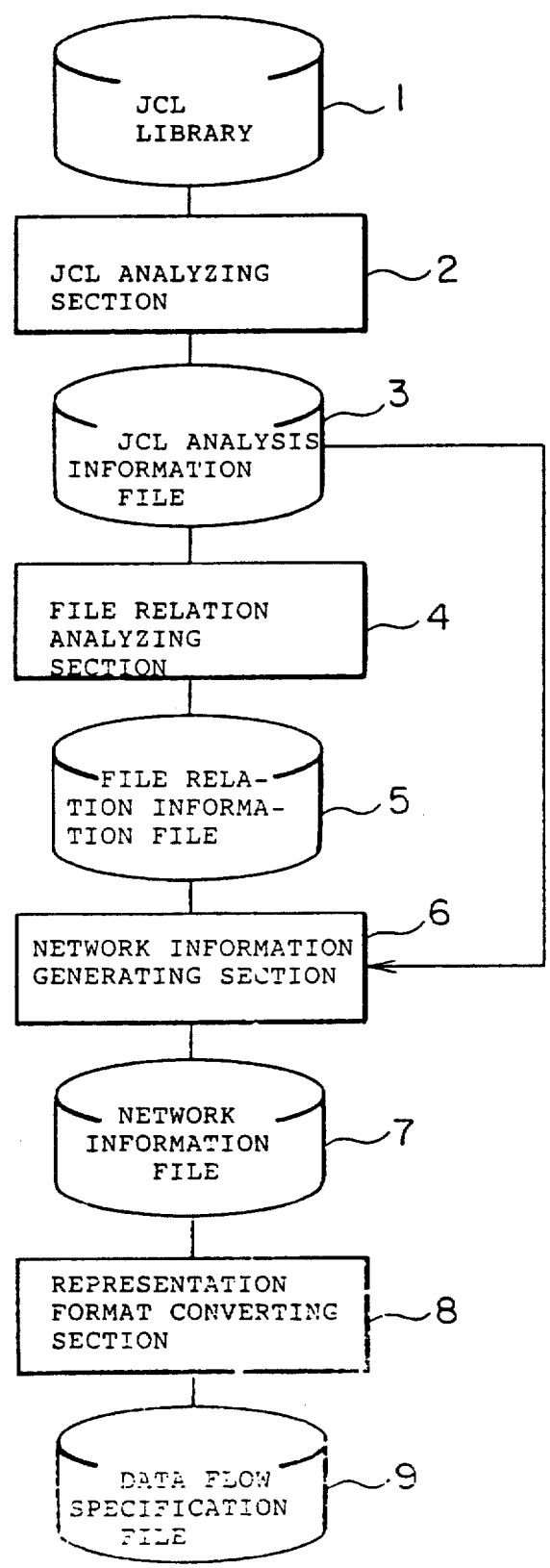
FIG. 1 is a functional block diagram of a first embodiment of an automatic software specifications generating method according to the present invention.
Figure 2:
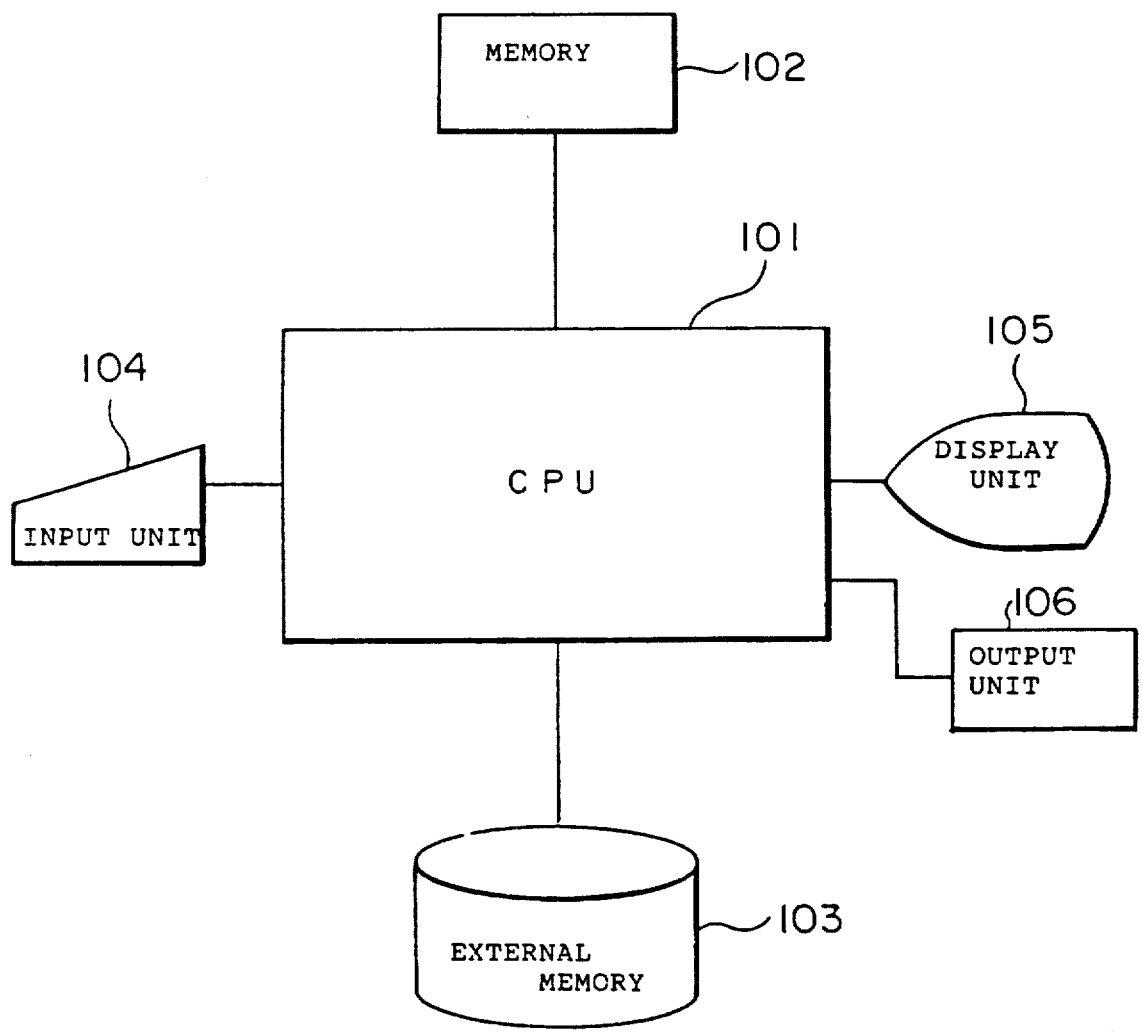
FIG. 2 is a block diagram showing hardware configuration for achieving the present invention.

FIG. 1 shows a functional block diagram for implementing the first embodiment of the present invention. FIG. 2 shows a configuration diagram of the hardware of an apparatus for implementing the embodiment of FIG. 1. The apparatus comprises a central processing unit (hereafter referred to as CPU) 101, a memory 102, an external memory 103, an input unit 104, an output unit 106, and a display unit 105.

A JCL library 1 represents a file containing a JCL group used for generation of a data flow specification. A JCL analyzing section 2 is supplied with the JCL group from the JCL library 1, and analyzes respective JCLs in accordance with a rule such as the rule described below. The JCL analyzing section 2 then outputs information contained in each JCL and information taken over from a high rank specification to a low rank specification, i.e., information relating to the input/output file of the pertinent job, to a JCL analysis information file 3.

Rules of JCL analysis are as follows.

(1) If a printer is assigned as hardware classification of an input/output unit, analysis information is output as a form (slip) output.

(2) If a device other than a printer is assigned as hardware classification of an input/output unit, a file name and input/output discrimination are output as analysis information.

FIGS. 3A and 3B show examples of a JCL stored in the JCL library 1. FIG. 4 shows examples of JCL analysis information obtained by analyzing JCLs of FIGS. 3A and 3B and stored in the JCL analysis information file 3.

In case of the present embodiment, a data flow, which is a high rank, is generated on the basis of at least one JCL, such as two JCLs, for example.

In JCL 1 shown in FIG. 3A, a job name "JOB 1" is given in a JOB statement 10. Input and output files used by the job are described in ASN statements 11 to 13. Within the ASN statement 11, "DISK", representing a magnetic disk unit, appears in an EQUIP operand 16 describing the classification of the input/output unit. The file name of a file generated in a file on the magnetic disk unit is defined as "FILE 1" by a FILE operand 17. Input/output (I/O) operand 18 indicates whether the file is an input file or an output file with respect to the present program. In the case of the present example, "INPUT", indicating that the file is an input file, is described in the input/output operand 18. In an ASN statement 12 as well, a magnetic disk unit is assigned as an input/output unit in the same way. Its file name is "FILE 2". In an I/O operand 19 describing the input/output classification, "OUTPUT", indicating that the file is an output file, is described. Within ASN statement 13, "PRINTER", representing a printer unit, is described in an EQUIP operand 20, describing the classification of the input/output unit. The form name is defined as "A" in an OUTCLASS operand 21. A statement 14 is a statement describing the name of a program executed by the job. In the present example, a program named "PROGRAM 1" is executed. A statement 15 indicates the end of the job.

Similar analysis is applied to JCL 2 of FIG. 3B. FIG. 4 shows an example of a JCL analysis information file thus output.

A file relation analyzing section 4 of FIG. 1 is supplied with the JCL analysis information file 3. The file relation analyzing section 4 extracts a plurality of jobs using a common item, i.e., common file name (FILEs 1, 2 and 3) for every file name and outputs names of commonly used files and names of jobs commonly using the files to a file relation information file 5.

FIG. 5 shows examples of information extraction of commonly used files in the case when the JCL analysis information file 5 of FIG. 4 is input. By paying attention to input/output names, i.e., file/form names as common items, the extracted information is compiled. Therefore, JOB 1 and JOB 2 are handled as singly existing items with respect to the common items. In the JCL analysis information file of FIG. 4, FILE 1 22 of FIG. 5 which is a common item is used only as the input file of JOB 1. As the reference job name of the FILE 1 22, therefore, "JOB 1" is registered. That is to say, "JOB 1" is registered as a singly existing item with respect to FILE 1. Since FILE 2 23 which is a common item of FIG. 5 is updated by the job name "JOB 1" and referred by the job name "JOB 2" as shown in FIG. 4, update job "JOB 1" and reference job "JOB 2" are registered as singly existing items with respect to FILE 2. Since FILE 3 24 which is a common item of FIG. 5 is used only as the output file of "JOB 2", update job name "JOB 2" is registered as a singly existing item with respect to FILE 3. It is known from the JCL analysis information of FIG. 4 that form output A 25, which is a common item is output from the job name "JOB 1". Therefore, update job name "JOB 1" is registered as a singly existing item with respect to the common item A.

Figure 6:
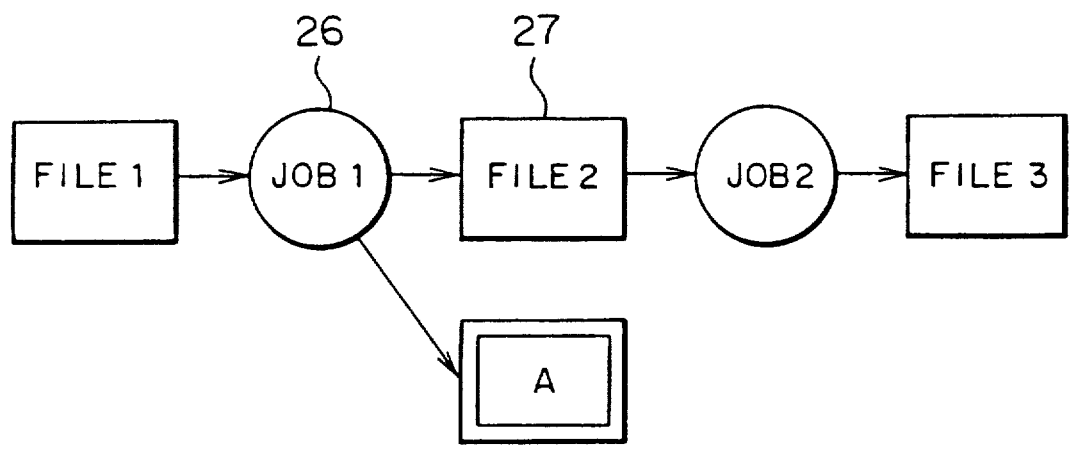
FIG. 6 diagrammatically shows reference/update relations of file/form names of FIG. 5 expanded in a network form.

On the basis of information represented by the JCL analysis information file 3 and the file relation information file 5, a network information generating section 6 generates network information representing the relation among items, i.e., jobs, files and forms connected in a network form and outputs it to a network information file 7. The network information thus generated has all items existing in the JCL analysis information, i.e., all jobs, files and forms as nodes and has branches depending upon reference relations between files and jobs or between jobs and forms. For a file commonly used among a plurality of jobs as distinguished by the file relation analyzing section, such network information that only one node relating to that file exists is generated. FIG. 6 shows an example of diagrammatic representation of network information generated on the basis of the JCL analysis information shown in FIG. 4 and the file relation information shown in FIG. 5. In FIG. 6, a character train surrounded by a circle O, a character train surrounded by a frame □ and a character train surrounded by a double frame ▣ represent a job node, a file node and a form node w their respective meanings, respectively. Further, an arrow represents a branch between a job and a file or between a job and a form. The direction of an arrow represents the direction of reference. Paying attention to JOB 1 26 of FIG. 6, "FILE 1" is given as the input file and "FILE 2" and "A" are given respectively as the output file and the form as shown in the JCL analysis information of FIG. 4. Therefore, "FILE 1" is connected to the node "JOB 1" representing the job as its input node, and the file "FILE 2" and the form "A" are connected to the node "JOB 1" as its output node. Although "FILE 2" 27 is a file commonly used by the jobs "JOB 1" and "JOB 2" as shown in FIG. 4, it is understood that only one node representing that file exists with regard to the network information.

Finally, a representation format converting section 8 of FIG. 1 is supplied with the network information file 7 and converts representation formats of respective items of network information to obtain a data flow specification which is a high rank specification desired. The representation format converting section 8 receives network information and defines positions whereat respective nodes and branches are disposed in the specification to be generated. The algorithm for defining arrangement positions is known and is described in "Application Oriented Memory", Information Processing, 1986, No. 6, published in Japan, for example. After arrangement positions have been defined, the representation format converting section 8 converts the representation formats of respective nodes and branches and outputs the result to a data flow specification file 9.

Figure 7:
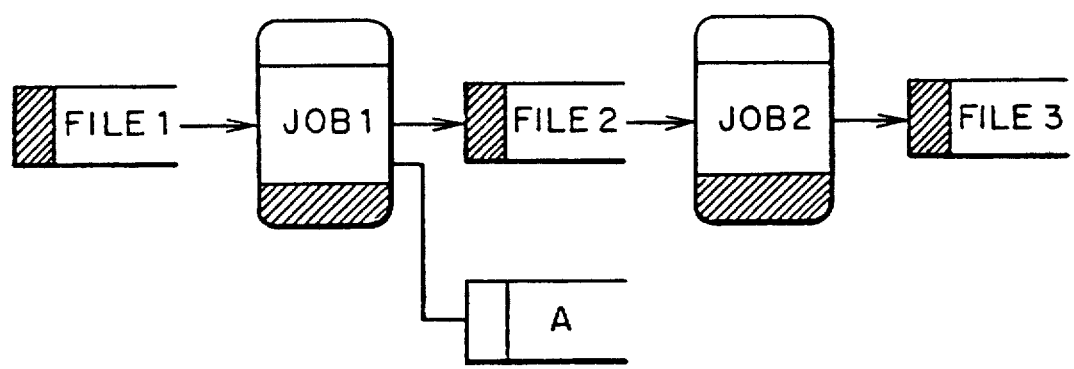
FIG. 7 shows a data flow diagram obtained by applying form conversion to respective nodes of network information of FIG. 6.

FIG. 7 shows an example of the data flow specification represented by SDF (Structured Dataflow Diagram) which is one kind of data flow diagram representing the data flow between jobs in a network form.

In the above described embodiment, files 1, 3, 5, 7 and 9 of FIG. 1 comprise parts of the external memory 103 of FIG. 2, and the analyzing sections 2 and 4, the generating section 6 and the converting section 8 represent functions of the CPU 101.

Processing of FIG. 1 is performed in accordance with a program stored in the memory 102.

In the first embodiment heretofore described, all of the information relating to inputs and outputs of files required for generating the data flow specification is obtained from JCL. In some computer system where the first embodiment is applied, sufficient information cannot be obtained only from a JCL. A second embodiment which is suitable for such a case will now be described.

Figure 8:
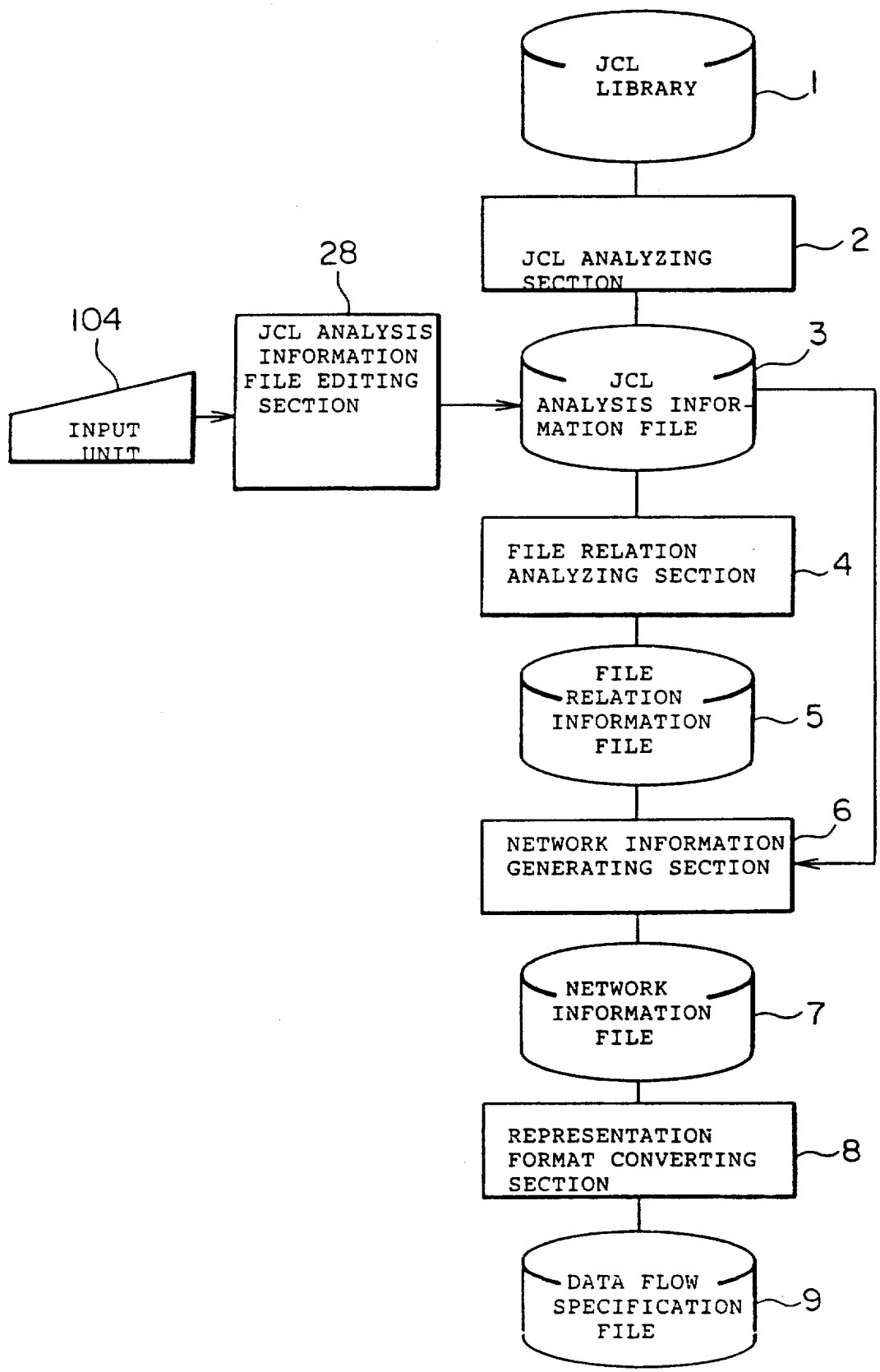
FIG. 8 is a functional block diagram of a second embodiment of the present invention.

FIG. 8 is a functional block diagram of the present embodiment. In FIG. 8, a block having the same function as that of a block of FIG. 1 is denoted by a numeral which is identical with that of the block of FIG. 1.

The functional block diagram of FIG. 8 is identical with that of FIG. 1 except that a JCL analysis information file editing section 28 is added to the block diagram of FIG. 1. The function of the analysis information file editing section 28 is performed by the CPU 101.

FIGS. 9A and 9B show examples of a JCL stored in the JCL library 1. The JCLs of FIGS. 9A and 9B are the same as those of FIGS. 3A and 3B except that the input/output discrimination with respect to "FILE 2" as indicated by underline 29 is not described in the JCL for executing "JOB 1" shown in FIG. 9A. FIG. 10 shows an example of the JCL analysis information file 3 obtained when JCLs of FIGS. 9A and 9B are analyzed by the JCL analyzing section 2 of FIG. 8. In FIG. 10, an input/output discrimination 30 relating to the job name "JOB 1" and the file name "FILE 2" remains blank. When only this JCL analysis information is inputted to the file relation analyzing section 4 shown in FIG. 8, it is unknown whether the job refers to the file or updates the file. Therefore, required network information is not complete. By manually inputting the input/output discrimination relating to the FILE 2 of JOB 1 to the JCL analysis information editing section 28 via the input unit 104, however, it becomes possible to complete the FILE 2 of FIG. 10 and then complete the network information. It also becomes possible to add, delete and update the information relating to the job name, file name and form name in the same way.

The objective data flow specification is then generated in accordance with the same procedure as that of the embodiment of FIG. 1.

Figure 11:
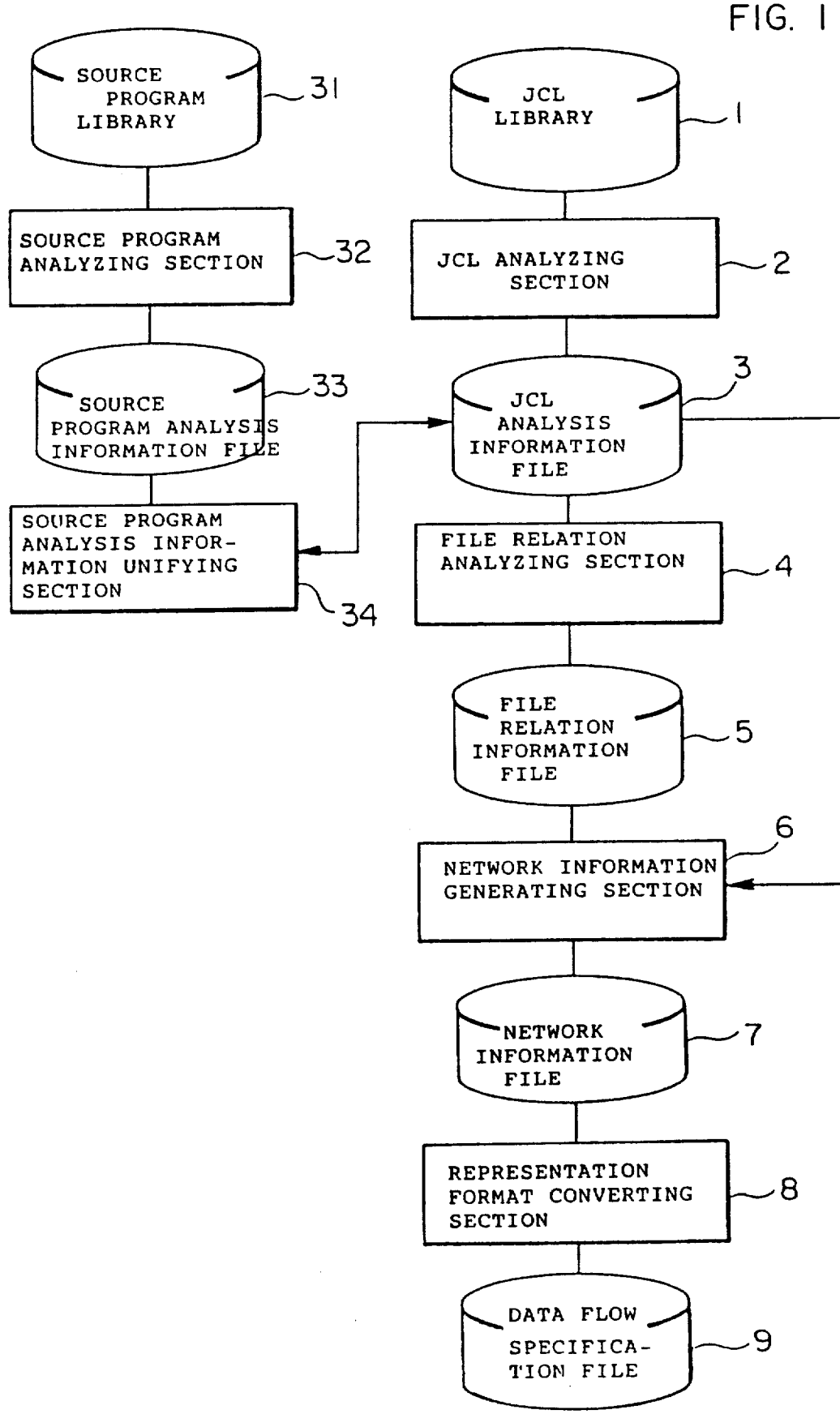
FIG. 11 is a functional block diagram of a third embodiment of the present invention.

In the above described second embodiment, deficient information for generating the data flow specification is supplemented by manually editing the JCL analysis information. FIG. 11 shows the functional block diagram of a third embodiment of the present invention. In the third embodiment, information of a program, which is the detailed specification of respective programs executed by the JCL described in the JCL library, is analyzed, and the deficient information is supplemented by the information thus analyzed.

The functional block diagram of the embodiment of FIG. 11 is identical with that of FIG. 1 except that a source program library 31, a source program analyzing section 32, a source program analysis information file 33 and a source program analysis information unifying section 34 are added to the functional block diagram of the embodiment of FIG. 1.

In the unifying section 34 of FIG. 11, the information of input/output discrimination of the file used by the job is supplemented.

Figures 12, 13:
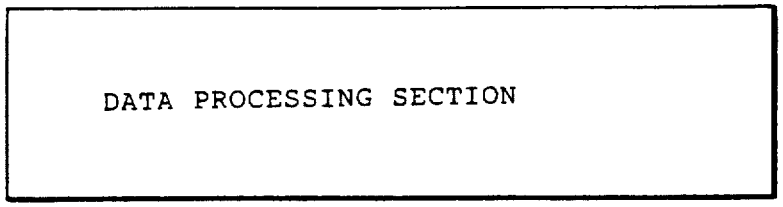
FIG. 12 shows examples of a source program input to the third embodiment.
FIG. 13 shows the result of the analysis of the source program.

FIG. 12 shows an example of coding using C language of a program "PROGRAM 1" executed by JCL 1 of FIG. 9. In FIG. 12, input and output files of the program are assigned by fopen statements 35 to 37 and then data processing is performed. Here, "FILE 1" is assigned to an input file by the statement 35, and "FILE 2" is assigned to an output file by the statement 36, whereas "A" is assigned to the form output file by the statement 37. The present program is stored in the source program library 31.

The source program analyzing section 32 is supplied with the present program from the source program library 31 and outputs information relating to the program input and output described in the statements 35 to 37 to the source program analysis information file 33 of FIG. 11.

An example of information stored in the source program analysis information file 33 and obtained by analyzing the example of the program of FIG. 12 is shown in FIG. 13. The JCL analysis information file 3 and the source program analysis information file 33 are then input to the source program analysis information unifying section 34 of FIG. 11. Comparison is made on the basis of the program name and the file name contained in respective files. Information of input/output discrimination obtained from the source program analysis information file 33 is added to a file which is contained in the JCL analysis information file and which does not have input/output discrimination.

Figure 14:
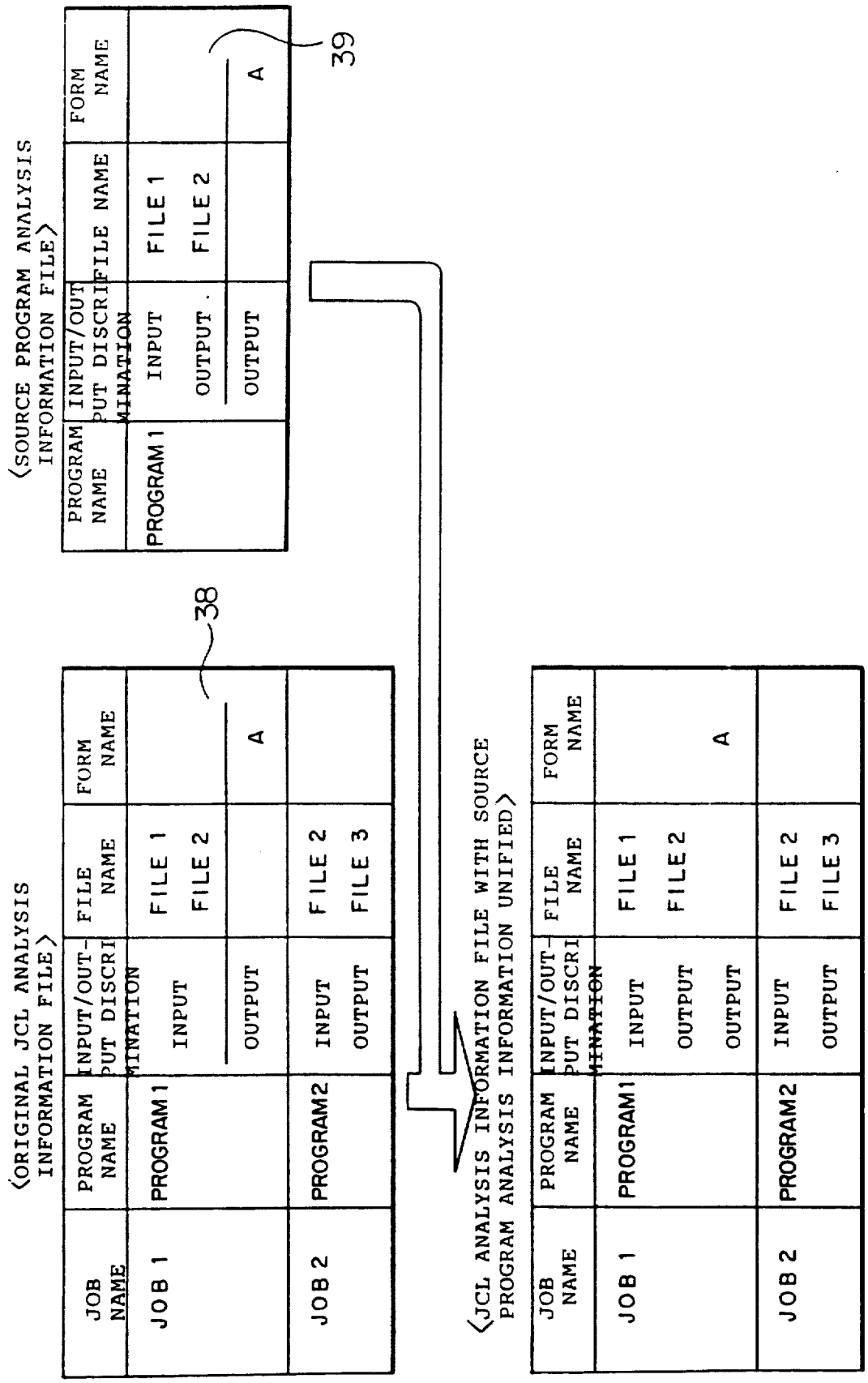
FIG. 14 shows an example of supplementing deficient information by using the result of program analysis.

In case of FIG. 14, an input/output division 38 of the program name "PROGRAM 1" and file name "FILE 2" in the JCL analysis information file is undetermined. A row 39 having the same program name and the same file name is retrieved from the source program analysis information file, and the JCL analysis information file is supplemented with the information of the input/output division of that row.

The data flow specification can then be generated in accordance with the same procedure as that of the embodiment of FIG. 1.

Figure 15:
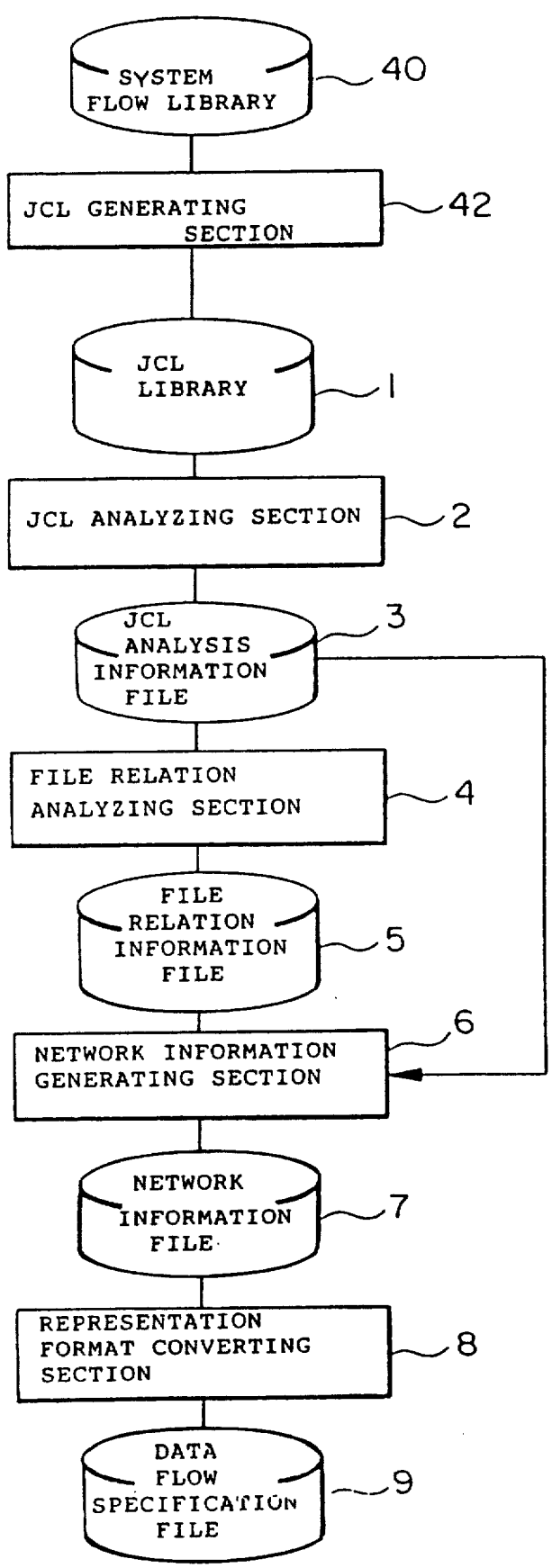
FIG. 15 is a functional block diagram of a fourth embodiment of the present invention.

In each of the described embodiments, the data flow specification is generated from the job control language as a high rank specification. In a fourth embodiment, however, a data flow specification is generated from a system flow specification diagrammatically describing the execution sequence of programs within a job and input and output files of programs. The fourth embodiment will now be described by referring to a functional block diagram shown in FIG. 15.

Figure 16A:
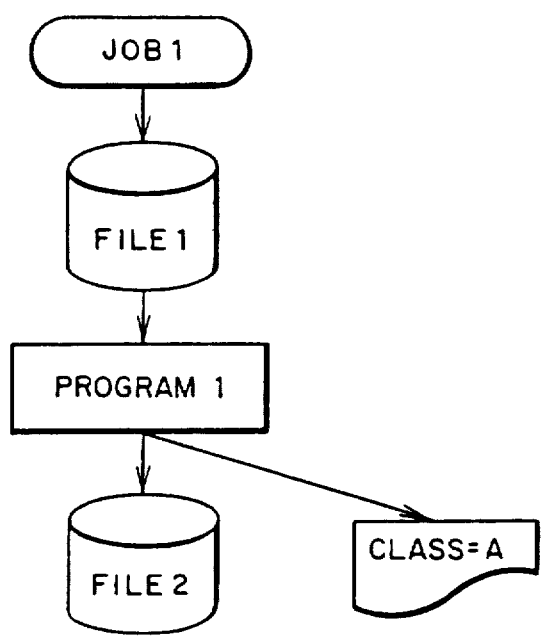
FIGS. 16A and 16B show examples of system flow input to the fourth embodiment.
Figure 16B:
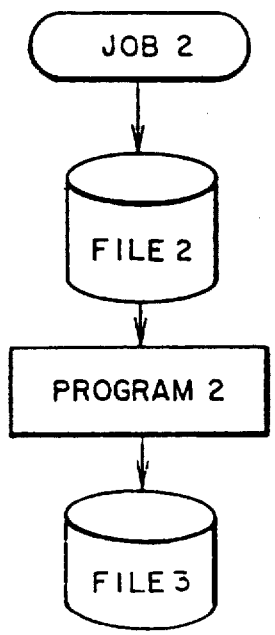

The system flow is a specification on the basis of which a JCL is generated. For example, system flows for JCL groups JCL 1 and JCL 2 respectively of FIGS. 3A and 3B are shown in FIGS. 16A and 16B, respectively. In the system flows shown in FIGS. 16A and 16B, it is possible to discriminate the classification of an input/output unit such as a disk and a printer on the basis of the shape of a figure and discriminate whether an input/output unit such as FILE 1 and FILE 2 is used for input or output on the basis of the state of its connection to the PROGRAM 1 or 2 (i.e., direction of arrow). The data flows can be generated from the system flows shown in FIGS. 16A and 16B by adding a system flow library 40 and a JCL generating section 42 before the JCL library 1 of the functional block diagram shown in FIG. 1. The system flow library 40 is a file containing a system flow group used for generating the data flow specification and comprises a part of the external memory 103. The JCL generating section 42 is supplied with a system flow group from the system flow library 40. The JCL generating section 42 generates JCLs from each system flow and supplies the JCL group thus generated to the JCL library 1. In this way, the data flow can then be generated in the same way as the embodiment of FIG. 1.

As described above, each of the first to third embodiments prepares a high rank specification by treating the input and output names as the common items.

In a fifth embodiment, an E. R. (Entity Relation) Specification representing the relation between components within the data base is generated on the basis of data base definition information described by using the data base describing language. The fifth embodiment will now be described by referring to FIG. 17 which is a concept diagram. In the present embodiment, data base definition information is extracted from at least one data base describing file such as, for example, two files 50 and 52 and analyzed in the same way as the above described embodiments to generate an E. R. specification 54 representing the relations between components included in the data base as shown in FIG. 17, for example.

In the example of FIG. 17, the file 52 has attributed RECORD S, RECORD P and RECORD SP indicating a memory (such as a disk) and information items such as SNO or PNO. The file 50 has items SET S_SP and SET P_SP indicating association of information between RECORDs. From these contents of the files 50 and 52, therefore, an E. R. specification is generated by treating RECORDs S, P and SP as the common items.

Figure 18:
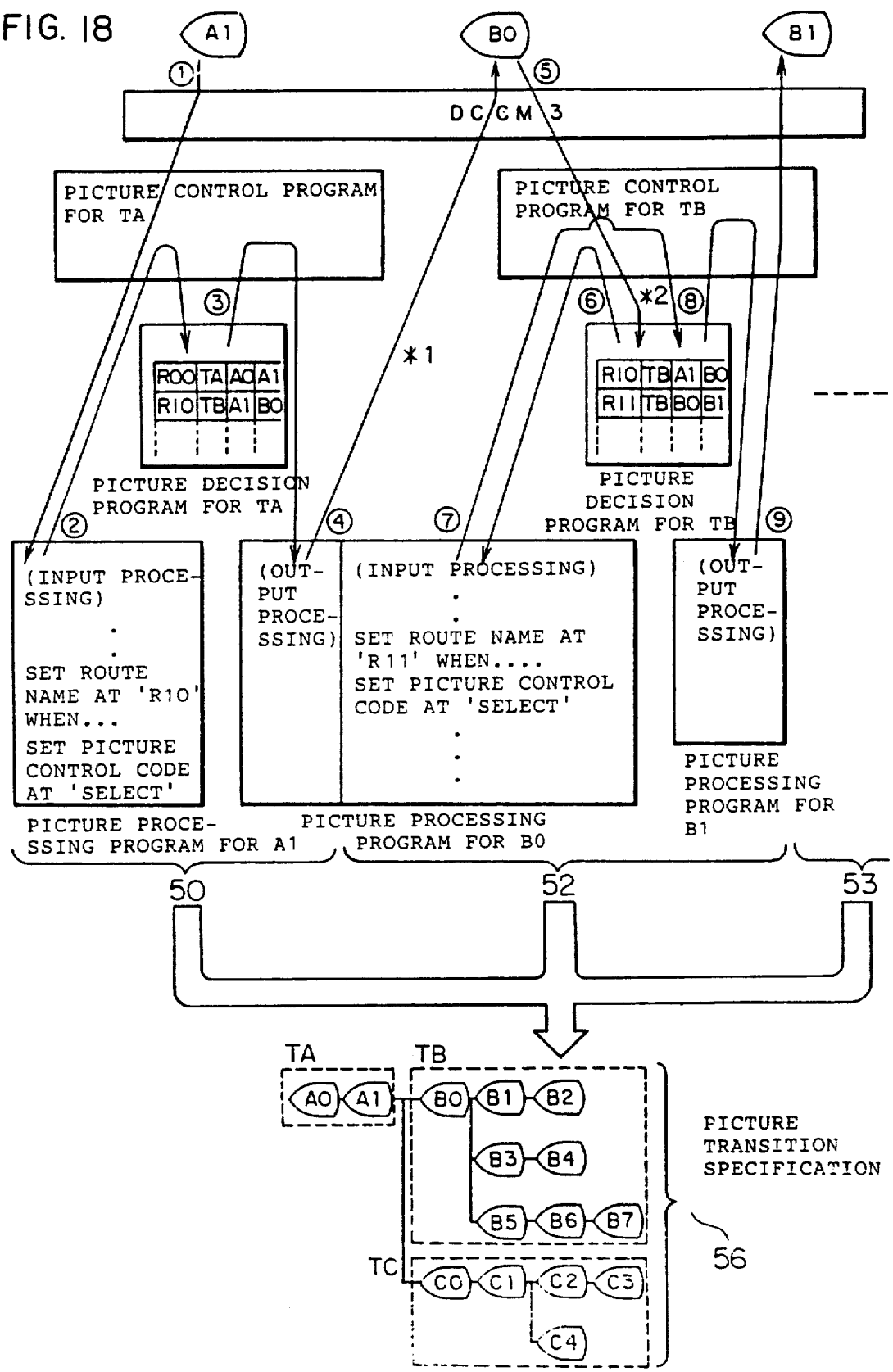
FIG. 18 is a concept diagram of a sixth embodiment of the present invention.

In a sixth embodiment, a picture transition specification representing the picture name and picture transition state of an on-line program is generated from a source program of the on-line program. The sixth embodiment will now be described by referring to a concept diagram shown in FIG. 18.

In the present embodiment, a picture transition specification is generated on the basis of information (such as A1, B0 or B1) representing the picture names as the common items and information (such as R00, R10 or R11) representing picture transition conditions which are contained in the source program (such as 50 or 52) of at least one on-line program. A picture decision program contained in the source program 50, for example, of FIG. 18 means that the picture changes from A0 to A1 when condition R00 is set and the picture changes from A1 to B0 when condition R10 is set. On the basis of such information contained in each source program, a picture transition diagram is generated in the same way as the first embodiment.

The present invention makes it possible to automatically generate a high rank specification on the basis of a generated software product such as a program, JCL or a low rank specification. Matching between the contents of the high rank specification and the software product is assured, and hence software maintenance work becomes more made efficient.

Even if partial information of a low rank specification or a program, such as the I/O operand of FILE 1 of FIG. 3A, is subject to a change, such as a change from INPUT to OUTPUT, the information thus altered is taken over to a high rank specification as it is. Therefore, the contents of the low rank specification or the program always agree with those of the generated high rank specification, maintenance being facilitated.

Figure 19:
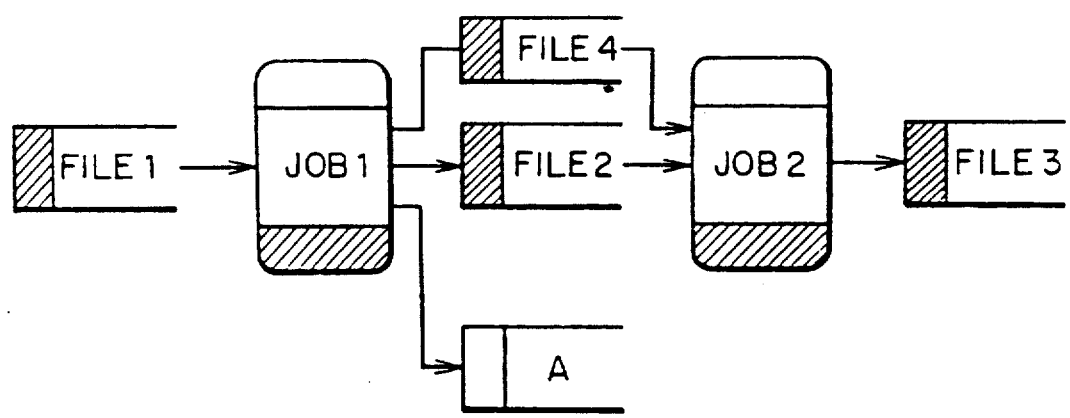
FIG. 19 is a data flow diagram used for explaining the processing of the present invention performed in alteration of specifications.

Further, the contents of the low rank specification or the program can be correctly altered by performing specification alteration on the basis of the high rank specification thus generated. Assuming that FILE 4 is added as an output file of JOB 1 and an input file of JOB 2 in the data flow specification of FIG. 7, for example, specifications at respective stages can be amended correctly on the basis of FIG. 19 by amending the data flow specification as shown in FIG. 19.

We claim:

1. A computer-implemented method for generating a high rank software specification, the method comprising computer-implemented steps of:
   reading a first software product describing information which is useful for inclusion in the high rank specification;
   extracting from the read first software product describing information, first information necessary for said high rank specification;
   classifying said first information into common items and other items, each said other item singly existing and referring to at least one of common items;
   compiling for each of the common items the other items referring to each of the common items;
   connecting the each of the other items on the basis of said first information in a network structure wherein the each of the other items is connected to the common items to which the each of the other items refers;
   generating network information which represents relationships among the common items and other items; and,
   converting a representation format of the common items and the other items of said network information to generate a high rank specification.

2. The method according to claim 1, further comprising the steps of:
   supplementing the first information necessary for said high rank specification with second information; and
   compiling said first information and said second information for the common items.

3. The method according to claim 2, wherein the second information comprises at least one item which is deficient in the first information and which singly exists in relation to at least one of said common items.

4. The method according to claim 1, further comprising the steps of:
   reading an other software product describing third information;
   extracting the third information necessary for said high rank specification to supplement said first information; and,
   compiling the first information and the third information for the common items.

5. The method according to claim 3, wherein the third information comprises at least one item which is deficient in the first information and which singly exists in relation to at least one of said common items.

6. The method according to claim 1, wherein said software product comprises a job control language, and wherein a data flow specification describing a data flow diagram is generated as said specification at said converting step.

7. The method according to claim 1, wherein said software product comprises a system flow specification diagrammatically describing a sequence of program execution and input and output files of programs within a job, and wherein a data flow specification describing a data flow diagram is generated as said high rank specification.

8. The method according to claim 1, wherein said software product comprises data base defining information described by a data base describing language, and wherein an Entity Relation Specification representing the relation between components included in the data base is generated as said high rank specification.

9. The method according to claim 1, wherein said software product comprises a source program of an on-line program which includes, as common items, names of a plurality of images selectively displayed on display means and information relating to a change between the images to be displayed, and wherein the method further comprises preparing a specification, in which a changing state between the displayed images is represented by using said names of said plurality of images, as said high rank specification.

10. An apparatus for generating a high rank software specification, comprising:
    first means for reading information described in at least one software product which is obtained by selecting a high rank specification and for extracting from the read information described in at least one software product, first information necessary for said high rank specification;
    second means for classifying said first information into common items and other items, each of said other items singly existing and referring to at least one of said common items, and for compiling for each of the common items the other items referring to the each of the common items;
    third means for connecting each of the other items on the basis of said first information in the network structure wherein the each of the other items is connected to the common items to which the each of the other items refer and for generating network information which represents relationships among the common items and the other items; and,
    fourth means for converting a representation format of each item of said network information to generate the high rank specification.

11. The apparatus according to claim 10, further comprising:
    fifth means for supplementing the first information necessary for said high rank specification with second information; and
    said second means for compiling said first information and said second information for the every common item.

12. The apparatus according to claim 11, wherein the second information comprises at least one item which is deficient in the first information and which singly exists in relation to at least one of said common items.

13. The apparatus according to claim 10, further comprising:
    sixth means for reading third information described in at least another software product and for extracting third information necessary for said high rank specification to supplement said first information therewith; and
    said second means for compiling the first information and third information for every common item.

14. The apparatus according to claim 12, wherein the third information comprises at least one item which is deficient in the first information and which singly exists in relation to at least one of said common items.

15. The apparatus according to claim 10, wherein said software product is a job control language, and wherein a data flow specification describing a data flow diagram is generated as said specification by said fourth means.

16. The apparatus according to claim 10, wherein said software product comprises a system flow specification diagrammatically describing a sequence of program execution and input and output files of programs within a job, and wherein a data flow specification describing a data flow diagram is generated as said high rank specification by said fifth means.

17. The apparatus according to claim 10, wherein said software product comprises data base defining information described by a data base describing language, and wherein an Entity Relation Specification representing the relation between components included in the data base is generated as said high rank specification by fifth means.

18. The apparatus according to claim 10, wherein said software product comprises a source program of an on-line program which includes, as common items, names of a plurality of images selectively displayed on display means and information relating to a change between the images to be displayed, and further comprising a firth means for preparing a specification, in which a changing state between the displayed images is represented by using said names of the plurality of images, as said high rank specification.

19. A computer-implemented method of generating software specifications, the method comprising the computer-implemented steps of:
reading information described in at least one software product obtained from a low rank specification by implementing the low rank specification that is associated with a high rank specification;
extracting from the read information described in at least one software product information necessary to compose said high rank specification out of the information thus read;
classifying the extracted information into main node items representing main nodes on the high rank specification and other node items representing other nodes connected to at least one of said main nodes and each of said other node items being fed to or produced rom said main nodes;
compiling the main node items for each of the other nodes;
connecting said main node items and related other node items to form a network structure;
generating network information;
converting a representation format of each main node item and other node items of said network information to generate the high rank specification.

20. The method of modifying the software specification generated by the method of claim 19, the method comprising the steps of:
inputting contents of a modification of the software specification;
modifying one of the main node items and the other node items compiled in accordance with the contents of the modification;
connecting said main node items, relating other node items and the modified item to form a network structure;
generating network information;
converting a representation format of each main node item and other node items of said network information
thereby generating the high rank specification.

21. The method of modifying the software specification according to claim 20, wherein the content of the modification is addition, deletion, or change of a node item.

* * * * *

UNITED STATES PATENT AND TRADEMARK OFFICE
CERTIFICATE OF CORRECTION

PATENT NO. : 5,185,867
DATED : February 9, 1993
INVENTOR(S) : Kisio Ito

It is certified that error appears in the above-identified patent and that said Letters Patent is hereby corrected as shown below:

Claim 1, column 9, line 20, before "common" insert --said--.

Claim 18, column 11, line 25, delete "firth" and substitute therefor --fifth--.

Claim 19, column 12, line 8, delete "rom" and substitute therefor --from--.

Signed and Sealed this

Sixteenth Day of November, 1993

Attest:

BRUCE LEHMAN

Attesting Officer      Commissioner of Patents and Trademarks